United States Patent [19]
Lee

[11] Patent Number: 5,612,966
[45] Date of Patent: Mar. 18, 1997

[54] AUTOMATIC DATA TRANSMISSION RATE DETECTION CIRCUIT

[75] Inventor: Dong S. Lee, Kyungki-Do, Rep. of Korea

[73] Assignee: LG Semicon Co., Ltd., Cheongju, Rep. of Korea

[21] Appl. No.: 529,964

[22] Filed: Sep. 19, 1995

[30] Foreign Application Priority Data

Sep. 26, 1994 [KR] Rep. of Korea .............. 24201

[51] Int. Cl.<sup>6</sup> ............................................. G06F 11/00
[52] U.S. Cl. ................................... 371/61; 360/51
[58] Field of Search .................... 361/51; 371/61, 371/62, 5.1, 5.4, 47.1

[56] References Cited

U.S. PATENT DOCUMENTS 5,446,748  8/1995  Hasebe et al. .............. 371/61

*Primary Examiner*—Vincent P. Canney
*Attorney, Agent, or Firm*—Fleshner & Kim

[57] ABSTRACT

An automatic data transmission rate detection circuit comprising a data detector for detecting input data in response to an external reference clock pulse, a counting circuit for up-counting the reference clock pulse, the counting circuit clearing its count upon inputting an output signal from the data detector at its clear terminal during its counting operation, a data storage unit for storing an output value from the counting circuit upon inputting the output signal from the data detector at its load enable terminal, an individual detection circuit including a plurality of individual detectors, each of the plurality of individual detectors detecting a transmission rate and an error rate of individual data in response to an output signal from the data storage unit, a density detector for detecting the entire data transmission rate in response to individual data transmission rate detect signals from the plurality of individual detectors in the individual detection circuit, and an error detector for detecting in response to individual data error rate detect signals from the plurality of individual detectors in the individual detection circuit whether an error is present in the entire data transmission rate detected by the density detector.

12 Claims, 7 Drawing Sheets

FIG. 7A
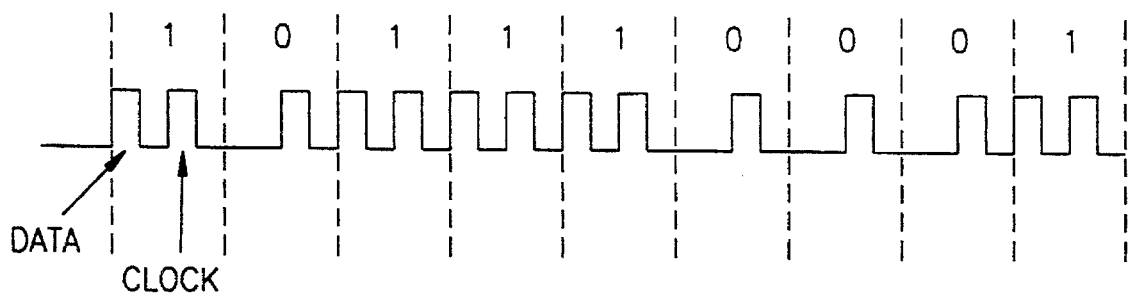
FIG. 7B
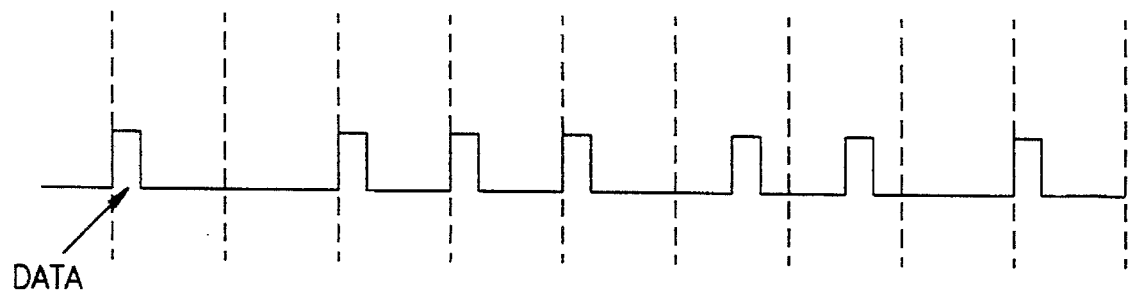
FIG. 8
| T3 | T4 | STATE |
|----|----|-------|
| 0 | 0 | IN PROCESS |
| 1 | 0 | TRANSMISSION RATE DETECTION, PROCESS COMPLETION |
| 1 | 1 | TRANSMISSION RATE DETECTION, ERROR GENERATION |

5,612,966

AUTOMATIC DATA TRANSMISSION RATE DETECTION CIRCUIT

BACKGROUND OF THE INVENTION

Field of the Invention

The present invention relates in general to the automatic detection of a data transmission rate in a serial data communication system, and more particularly to an automatic data transmission rate detection circuit for checking whether an error is present in a data transmission rate at the moment that the data transmission rate is detected and allowing the detected data transmission rate if it is checked that no error is present in the detected data transmission rate, thereby enhancing the performance of a control circuit for a hard disk, a floppy disk or a tape.

Description of the Prior Art

Referring to FIG. 1, there is shown, in block form, a conventional circuit for detecting a transmission rate of serial input data. As shown in this drawing, the conventional data transmission rate detection circuit comprises a controller 60 for generating a plurality of control signals under the control of a system control circuit SCC, a clock transmission rate pulse generator 40 for generating a plurality of clock transmission rate pulse signals in response to an external system clock signal CK, and a switch 50 being switched under the control of the controller 60. As being switched, the switch 50 selectively outputs one of the clock transmission rate pulse signals from the clock transmission rate pulse generator 40.

The conventional data transmission rate detection circuit further comprises a delay circuit 10 for delaying serial data from an input line T1 at a delay rate of the clock transmission rate pulse signal selected by the switch 50, a register 20 for applying data to the delay circuit 10 under the control of the controller 60, a transmitter/receiver circuit 30 for transmitting output data from the delay circuit 11 to the system control circuit SCC at a data transmission rate based on the clock transmission rate pulse signal selected by the switch 50, and a detector 70 for exclusive-ORing a value of the serial data from the input line T1 and a value of a 24th bit of the output data from the delay circuit 10 and outputting the exclusive-ORed result to the controller 60.

The operation of the conventional data transmission rate detection circuit with the above-mentioned construction will hereinafter be described with reference to FIGS. 2 to 4F.

FIG. 2 is a view illustrating a bit format of the input serial data based on an AT prompt protocol. In this drawing, the reference numeral 80 indicates an input bit string in which bits are shifted to the right. A series of idle bits of 1 level indicate that no data is transmitted. The reference numeral 91 indicates a waveform of data received for an idle time period. Characters "A" and "T" indicate prompts for determining a baud rate of a received information character string. Each character is expressed in a hexadecimal number. A start bit of 0 level precedes each character, which is followed by a stop bit of 1 level.

FIG. 3 is a flowchart illustrating the operation of the conventional data transmission rate detection circuit. First, the controller 60 performs an initialization operation at step 100. Namely, when the system clock signal CK is applied to the clock transmission rate pulse generator 40 and the serial data from the input line T1 is applied to the delay circuit 10, the controller 60 is enabled in response to a control signal which is applied thereto from the system control circuit SCC through a line T15. As being enabled, the controller 60 outputs a disable signal to the switch 50 through a line T16 to disable it and activates a pulse width measurement operation to detect the serial data from the input line T1 for a 1 bit idle time period. The controller 60 also outputs a control signal to the register 20 through a line T9 so that the register 20 can apply 1 to all 24 bit positions of the delay circuit 10.

At step 101, the controller 60 scans a bit string of the serial data from the input line T1 to detect a level transition from an idle bit of 1 level to a start bit of 0 level.

Upon detecting the level transition, the controller 60 outputs an enable signal to the switch 50 through the line T16 to enable it. In response to the system clock signal CK, the clock transmission rate pulse generator 40 generates a clock transmission rate pulse signal of 307.2 KHz with a delay rate of 3.26 µs by generating 16 pulses per bit at a highest data transmission rate of 19.2 Kbit and outputs the generated clock transmission rate pulse signal of 307.2 KHz to the switch 50 through a line T3. As being enabled, the switch 50 selects the clock transmission rate pulse signal of 307.2 KHz from the clock transmission rate pulse generator 40 through the line T3 and transfers the selected clock transmission rate pulse signal of 307.2 KHz to the delay circuit 10 through lines T7 and T8.

At step 102, a start bit of the serial data with a pulse width of 52 µs and a transmission rate of 19.2 Kbit is shifted to the delay circuit 10 at the delay rate of 3.26 µs of the clock transmission rate pulse signal of 307.2 KHz selected by the switch 50, as shown in FIG. 4A.

At the moment that the start bit is delayed by 24 bits at the delay rate of 3.26 µs of the clock transmission rate pulse signal of 307.2 KHz at step 103, a rising edge of the start bit appears at a 24th bit position 11 of the delay circuit 10 as shown in FIG. 4B. A falling edge of the start bit is followed by the first 1 level bit in the prompt A. As a result, the input line T1 becomes 1 in level and the 24th bit position 11 of the delay circuit 10 becomes 0 in level. Then, the detector 70 performs its exclusive-OR operation with respect to the two values of 0 and 1 and outputs the exclusive-ORed result to the controller 60. In response to the output signal from the detector 70, the controller 60 checks at step 104 whether the value on the input line T1 is equal to that of the 24th bit position 11 of the delay circuit 10.

The controller 60 is programmed to disregard the output signal from the detector 70 until the start bit is delayed by 24 bits at the delay rate of 3.26 µs of the clock transmission rate pulse signal of 307.2 KHz. Because the output signal from the detector 70 is 1 in level indicating that the value on the input line T1 is not equal to that of the 24th bit position 11 of the delay circuit 10 at step 104, the controller 60 recognizes at step 108 through a line T2 the first 1 level bit in the prompt A following the start bit.

The recognition of the first 1 level bit in the prompt A signifies the determination of a proper data transmission rate. As a result, upon recognizing the first 1 level bit in the prompt A, the controller 60 ends the entire operation in FIG. 3 and outputs a data transmission rate detect signal to the system control circuit SCC through the line T15. On the contrary, if the first 1 level bit in the prompt A is not recognized, the controller 60 abandons the present data transmission rate determining operation and then returns to step 100 to perform the initialization operation again to check the next start bit.

On the other hand, if a start bit of the serial data with a pulse width of 104 µs and a transmission rate of 9.6 Kbit is applied to the input line T1 as shown in FIG. 4C under the condition that the clock transmission rate pulse signal of 307.2 KHz on the line T3 selected by the switch 50 are applied to the delay circuit 10 through the lines T7 and T8, then it is shifted to the delay circuit 10 at the delay rate of 3.26 μs of the clock transmission rate pulse signal of 307.2 KHz.

At the moment that the start bit is delayed by 24 bits at the delay rate of 3.26 μs of the clock transmission rate pulse signal of 307.2 KHz at step 103, a 26 μs pulse portion of the start bit is not applied yet to the delay circuit 10 as shown in FIG. 4D. In this case, a rising edge of the start bit appears at the 24th bit position 11 of the delay circuit 10 and a falling edge thereof is not applied yet to the delay circuit 10. As a result, the input line T1 becomes 0 in level and the 24th bit position 11 of the delay circuit 10 becomes 0 in level, too.

Then, the detector 70 performs its exclusive-OR operation with respect to the two values of 0 and 0 and outputs the exclusive-ORed result to the controller 60. In response to the output signal from the detector 70, the controller 60 checks at step 104 whether the value on the input line T1 is equal to that of the 24th bit position 11 of the delay circuit 10.

Because the output signal from the detector 70 is 0 in level indicating that the value on the input line T1 is equal to that of the 24th bit position 11 of the delay circuit 10 at step 104, the controller 60 determines that a proper data transmission rate is not detected and applies the enable signal to the switch 50 through the line T16 to enable it. In response to the system clock signal CK, the clock transmission rate pulse generator 40 generates a lower ½ clock transmission rate pulse signal of 153.6 KHz with a delay rate of 6.52 μs and outputs the generated clock transmission rate pulse signal of 153.6 KHz to the switch 50 through a line T4. As being enabled, the switch 50 selects the clock transmission rate pulse signal of 153.6 KHz from the clock transmission rate pulse generator 40 through the line T4 and transfers the selected clock transmission rate pulse signal of 153.6 KHz to the delay circuit 10 through lines T7 and T8 at step 105. Also, the controller 60 outputs a control signal to the register 20 through a line T10 so that the register 20 can apply 1 to the last 8 bit positions of the delay circuit 10 at step 106. Further at step 106, the controller 60 disregards the output signal from the detector 70.

If the lower ½ clock transmission rate pulse signal of 153.6 KHz with the delay rate of 6.52 μs is applied to the delay circuit 10 through the lines T4, T7 and T8, the 26 μs pulse portion of the start bit of the serial data with the pulse width of 104 μs is not applied to the delay circuit 10 and the remaining 78 μs pulse portion is applied up to the 16th bit position of the delay circuit 10, as shown in FIG. 4E. If the start bit is further shifted by 8 bits at step 107, the rising edge of the start bit appears at the 24th bit position 11 of the delay circuit 10 and the falling edge thereof is applied to the delay circuit 10, too, as shown in FIG. 4F. As a result, the input line T1 becomes 1 in level and the 24th bit position 11 of the delay circuit 10 becomes 0 in level.

Then, the detector 70 performs its exclusive-OR operation with respect to the two values of 1 and 0 and outputs the exclusive-ORed result to the controller 60. In response to the output signal from the detector 70, the controller 60 checks at step 104 whether the value on the input line T1 is equal to that of the 24th bit position 11 of the delay circuit 10.

Because the output signal from the detector 70 is 1 in level indicating that the value on the input line T1 is not equal to that of the 24th bit position 11 of the delay circuit 10 at step 104, the controller 60 recognizes at step 108 through the line T2 the first 1 level bit in the prompt A following the start bit.

The recognition of the first 1 level bit in the prompt A signifies the determination of a proper data transmission rate. As a result, upon recognizing the first 1 level bit in the prompt A, the controller 60 ends the entire operation in FIG. 3 and outputs a data transmission rate detect signal to the system control circuit SCC through the line T15.

On the contrary, if the first 1 level bit in the prompt A is not recognized, the controller 60 abandons the present data transmission rate determining operation and then returns to step 100 to perform the initialization operation again to check the next start bit.

However, the above-mentioned conventional data transmission rate detection circuit must scan all tracks using all given clock transmission rate pulse signals, to determine a transmission rate of data stored in a storage medium. For this reason, the conventional data transmission rate detection circuit has much time required and imposes burden on an input/output device.

SUMMARY OF THE INVENTION

Therefore, the present invention has been made in view of the above problem, and it is an object of the present invention to provide an automatic data transmission rate detection circuit for checking whether an error is present in a transmission rate of data in a storage medium at the moment that the data transmission rate is detected and allowing the detected data transmission rate if it is checked that no error is present in the detected data transmission rate, so that a stable data transmission rate can be detected and the data transmission rate detecting time can be shortened, thereby enhancing the performance of an input/output system.

In accordance with the present invention, the above and other objects can be accomplished by a provision of an automatic data transmission rate detection circuit comprising data detection means for detecting input data in response to an external reference clock pulse; counting means for up-counting the reference clock pulse, the counting means clearing its count upon inputting an output signal from the data detection means at its clear terminal during its counting operation; data storage means for storing an output value from the counting means upon inputting the output signal from the data detection means at its load enable terminal; individual detection means including a plurality of individual detectors, each of the plurality of individual detectors detecting a transmission rate and an error rate of individual data in response to an output signal from the data storage means; density detection means for detecting the entire data transmission rate in response to individual data transmission rate detect signals from the plurality of individual detectors in the individual detection means; and error detection means for detecting in response to individual data error rate detect signals from the plurality of individual detectors in the individual detection means whether an error is present in the entire data transmission rate detected by the density detection means.

BRIEF DESCRIPTION OF THE DRAWINGS

The above and other objects, features and advantages of the present invention will be more clearly understood from the following detailed description taken in conjunction with the accompanying drawings, in which:

FIGS. 6A–E are a timing diagram illustrating the operation of the automatic data transmission rate detection circuit in FIG. 5 in accordance with the present invention, wherein:

FIG. 6A is a waveform diagram of a reference clock signal;

FIG. 6B is a waveform diagram of input data;

FIG. 6C is a waveform diagram of an output signal from a data detector; and

FIG. 6D is a waveform diagram of an output signal from a counting circuit; and

FIG. 6E is a waveform diagram of an output signal from a data storage unit;

FIGS. 7A–B are a timing diagram illustrating data coding methods, wherein:

FIG. 7A is a waveform diagram of a pulse signal based on a frequency modulation method; and FIG. 7B is a waveform diagram of a pulse signal based on a modified frequency modulation method; and FIG. 8 is a table illustrating output signals from density and error detectors in accordance with the present invention.

DETAILED DESCRIPTION OF THE PREFERRED EMBODIMENTS

Figure 1:
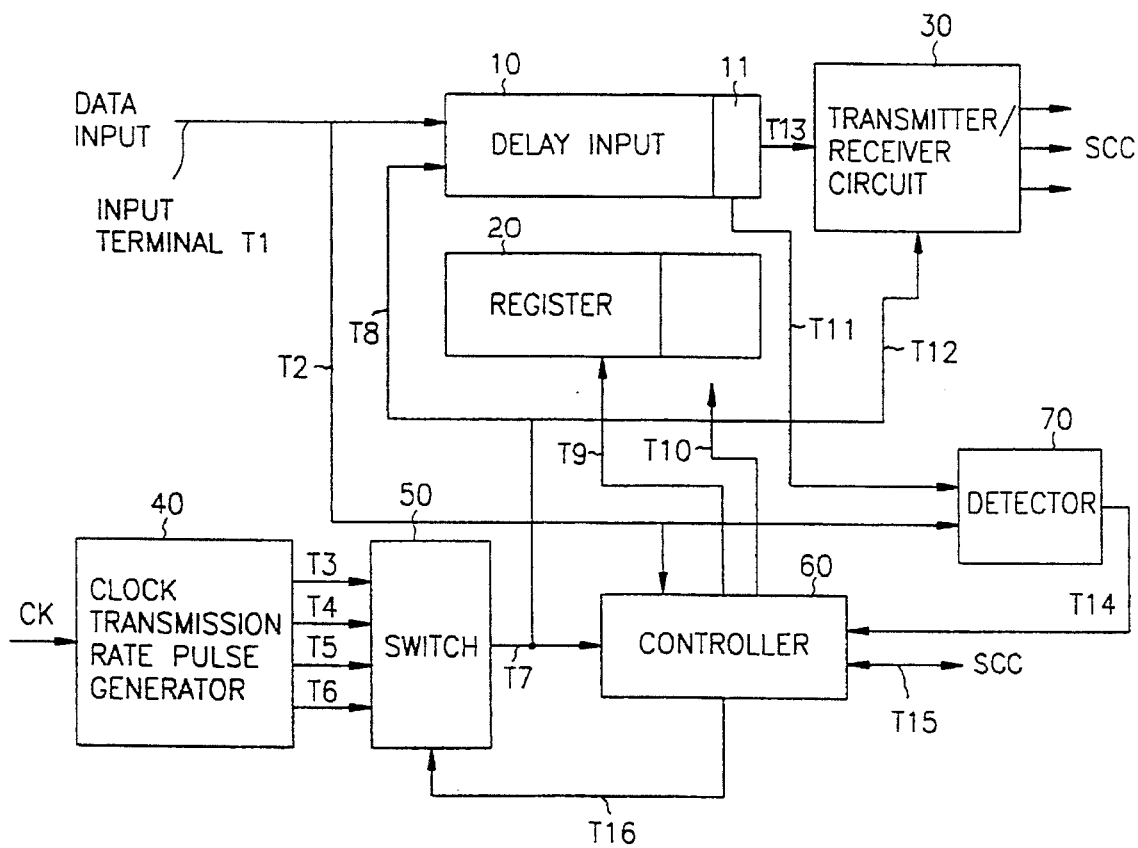
FIG. 1 is a block diagram of a conventional data transmission rate detection circuit.
Figure 2:
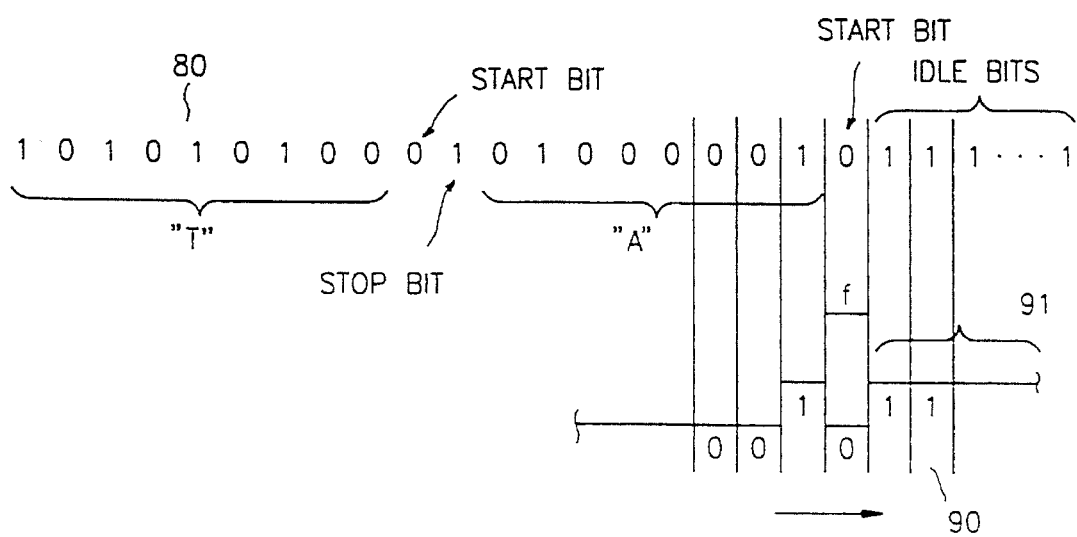
FIG. 2 is a view illustrating a bit format of input serial data based on an AT prompt protocol.
Figure 3:
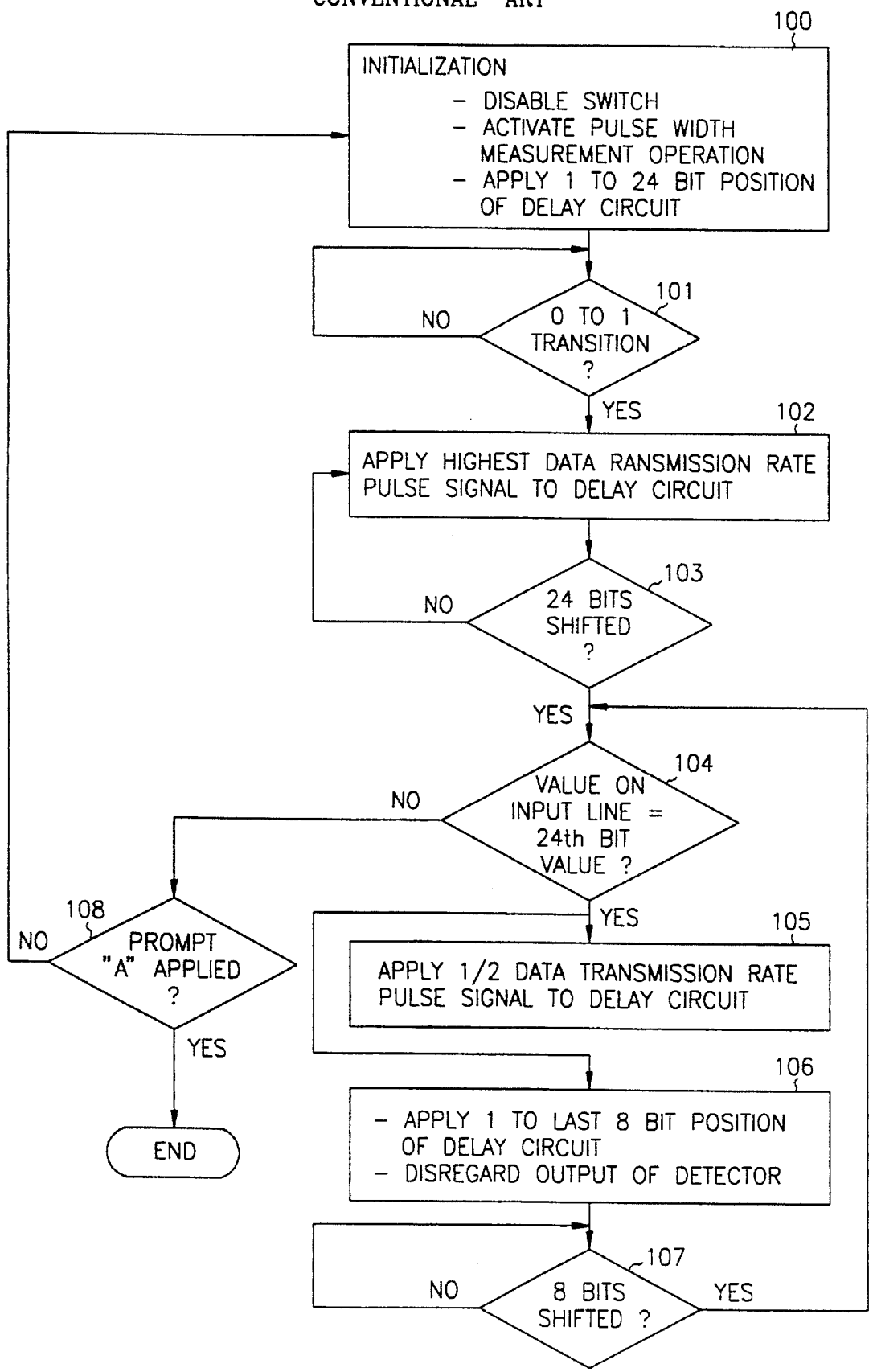
FIG. 3 is a flowchart illustrating the operation of the conventional data transmission rate detection circuit in FIG. 1.
Figure 4A:
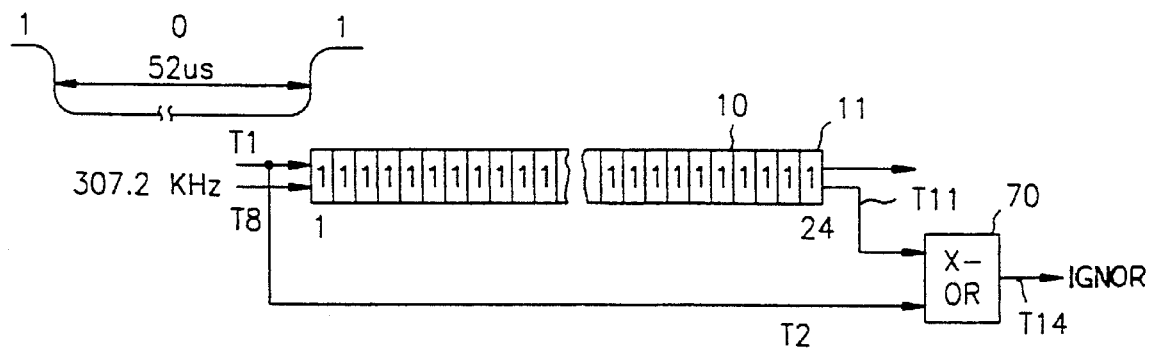
FIGS. 4A to 4F are views illustrating states of a delay circuit in FIG. 1 depending on clock transmission rate pulse signals.
Figure 4B:
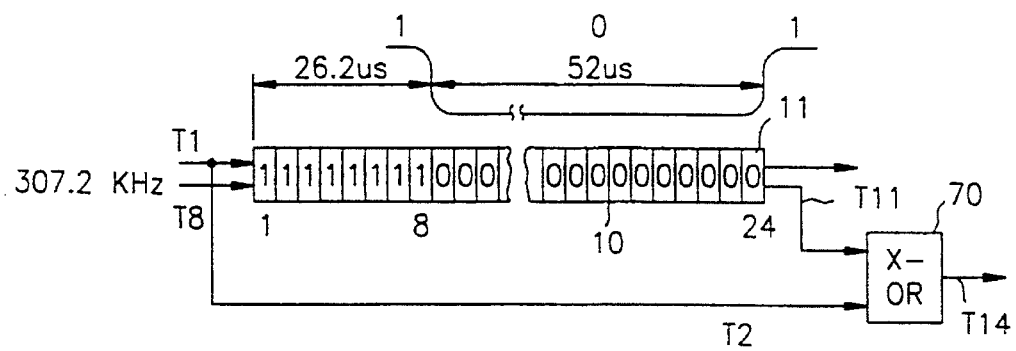
Figure 4C:
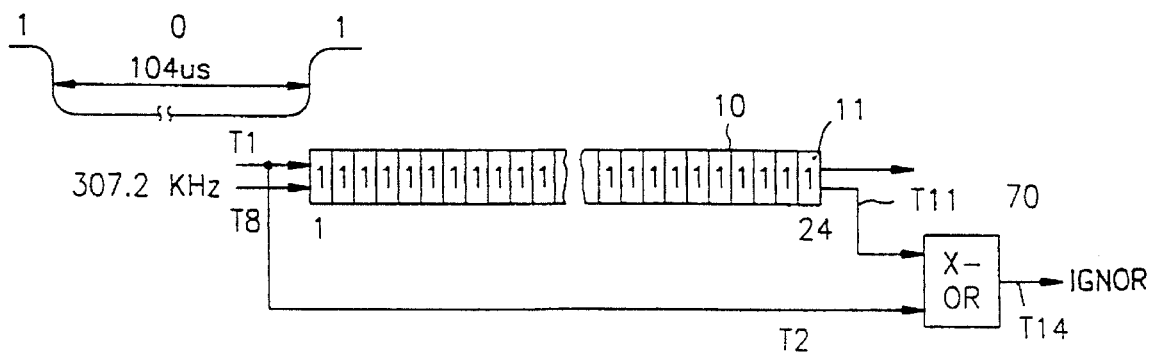
Figure 4D:
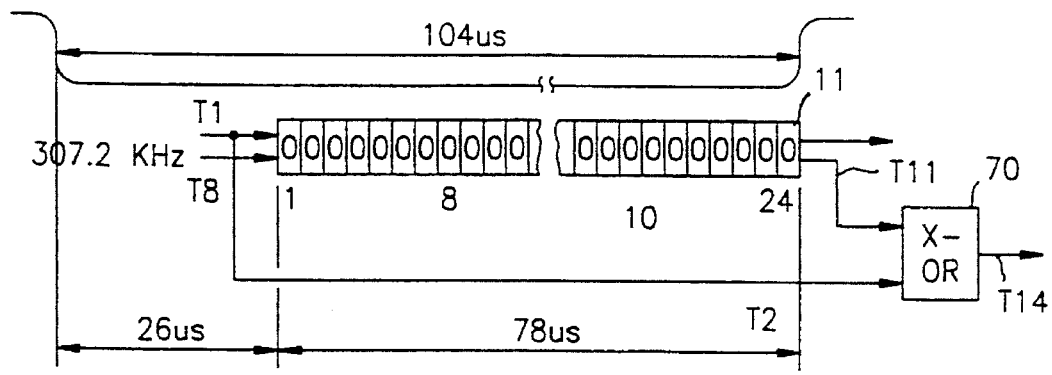
Figure 4E:
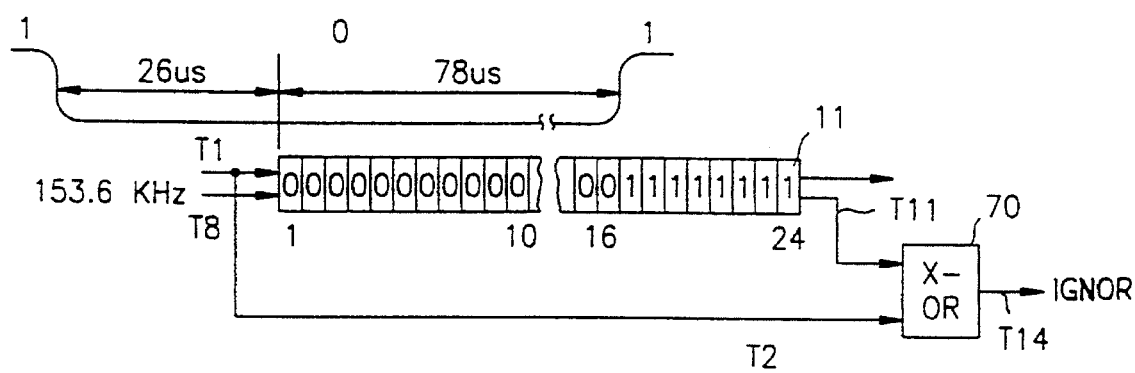
Figure 4F:
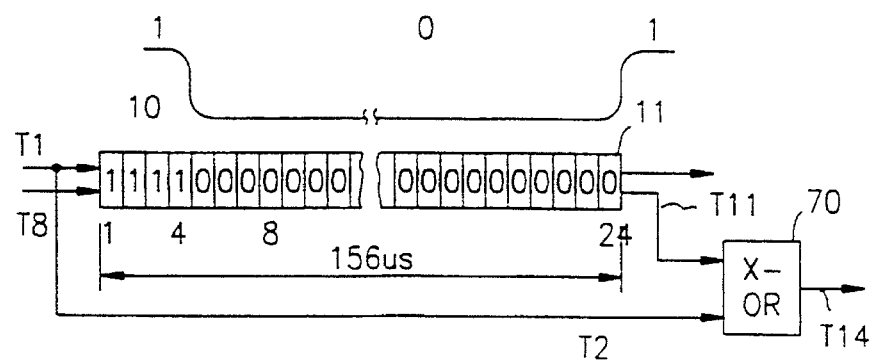
Figure 5:
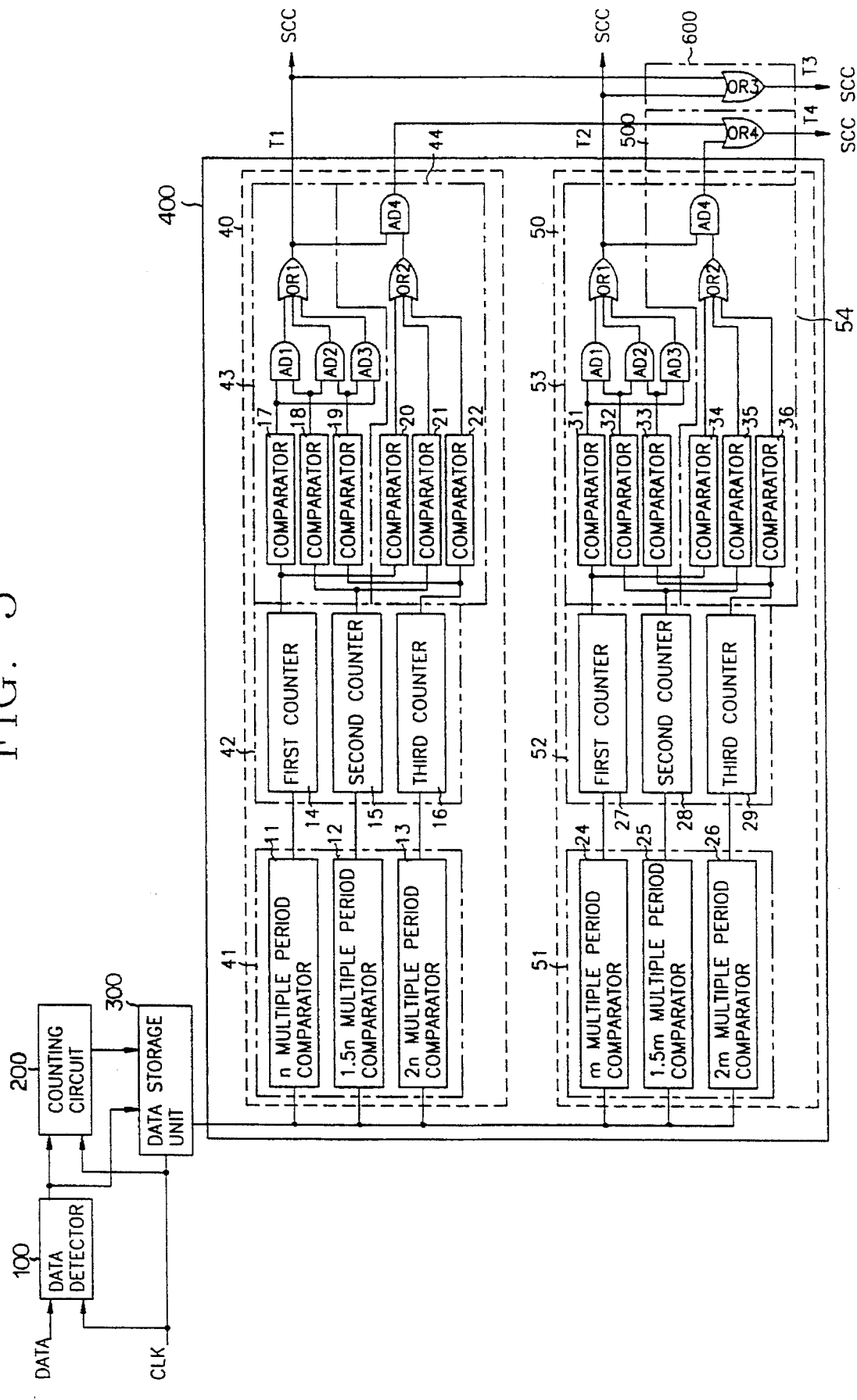
FIG. 5 is a block diagram of an automatic data transmission rate detection circuit in accordance with the present invention.

Referring to FIG. 5, there is shown a block diagram of an automatic data transmission rate detection circuit in accordance with the present invention. As shown in this drawing, the automatic data transmission rate detection circuit comprises a data detector 100 for detecting serial input data in response to an external reference clock pulse CLK. The data detector 100 is adapted to detect the serial input data at a rising or falling edge of the reference clock pulse CLK.

The automatic data transmission rate detection circuit further comprises a counting circuit 200 for up-counting the reference clock pulse CLK. The counting circuit 200 clears its count upon inputting an output signal from the data detector 100 at its clear terminal during its counting operation.

The automatic data transmission rate detection circuit further comprises a data storage unit 300 for storing an output value from the counter 200 upon inputting the output signal from the data detector 100 at its load enable terminal, and an individual detection circuit 400 including n individual detectors. Each of the n individual detectors is adapted to detect a transmission rate and an error rate of individual data in response to an output signal from the data storage unit 300.

The automatic data transmission rate detection circuit further comprises a density detector 600 for detecting the entire data transmission rate in response to individual data transmission rate detect signals from the n individual detectors in the individual detection circuit 400. To this end, the density detector 600 includes an OR gate OR3 for ORing the individual data transmission rate detect signals from the n individual detectors in the individual detection circuit 400 and outputting the ORed result as an entire data transmission rate detect signal to a system control circuit SCC.

The automatic data transmission rate detection circuit further comprises an error detector 500 for detecting in response to individual data error rate detect signals from the n individual detectors in the individual detection circuit 400 whether an error is present in the entire data transmission rate detected by the density detector 600. To this end, the error detector 500 includes an OR gate OR4 for ORing the individual data error rate detect signals from the n individual detectors in the individual detection circuit 400 and outputting the ORed result as an entire data error rate detect signal to the system control circuit SCC.

The first one 40 of the n individual detectors includes a comparison circuit 41 for performing a plurality of comparison operations with respect to the output signal from the data storage unit .300, a counting circuit 42 for performing a plurality of up-counting operations in response to a plurality of output signals from the comparison circuit 41, respectively, an individual data transmission rate detector 43 for detecting the individual data transmission rate in response to a plurality of output signals from the counting circuit 42 and outputting the resultant individual data transmission rate detect signal to the system control circuit SCC and the density detector 600, and an individual data error rate detector 44 for detecting the individual data error rate in response to the plurality of output signals from the counting circuit 42 and the individual data transmission rate detect signal from the individual data transmission rate detector 43 and outputting the resultant individual data error rate detect signal to the error detector 500.

The second individual detector 50 includes a comparison circuit 51 for performing a plurality of comparison operations with respect to the output signal from the data storage unit 300, a counting circuit 52 for performing a plurality of up-counting operations in response to a plurality of output signals from the comparison circuit 51, respectively, an individual data transmission rate detector 53 for detecting the individual data transmission rate in response to a plurality of output signals from the counting circuit 52 and outputting the resultant individual data transmission rate detect signal to the system control circuit SCC and the density detector 600, and an individual data error rate detector 54 for detecting the individual data error rate in response to the plurality of output signals from the counting circuit 52 and outputting the resultant individual data error rate detect signal to the error detector 500.

The remaining individual detectors 3-n are the same in construction as the first and second individual detectors 40 and 50 and details thereof will thus be omitted.

The comparison circuit 41 includes an n multiple period comparator 11, a 1.5n multiple period comparator 12 and a 2n multiple period comparator 13, each of which is made active when the output signal from the data storage unit 300 has a value within the range of ±10% with respect to a fixed reference value thereof.

The counting circuit 42 includes first to third counters 14–16, each of which performs its up-counting operation in response to a corresponding one of output signals from the n multiple period comparator 11, 1.5n multiple period comparator 12 and 2n multiple period comparator 13 in the comparison circuit 41.

The individual data transmission rate detector 43 includes a plurality of comparators 17–19, each of which is made active when a corresponding one of output signals from the first to third counters 14–16 in the counting circuit 42 has a larger value than a fixed reference value thereof.

The individual data transmission rate detector 43 further includes a plurality of AND gates AD1–AD3, each of which ANDs output signals from different two of the comparators 17–19.

The individual data transmission rate detector 43 further includes an OR gate OR1 for ORing output signals from the AND gates AD1–AD3 and outputting the ORed result as the individual data transmission rate detect signal to the system control circuit SCC and the density detector 600. The output signal from the OR gate OR1 is also applied to the individual data error rate detector 44.

The individual data error rate detector 44 includes a plurality of comparators 20–22, each of which is made active when a corresponding one of the output signals from the first to third counters 14–16 in the counting circuit 42 has a larger value than a fixed reference value thereof.

The individual data error rate detector 44 further includes an OR gate OR2 for ORing output signals from the comparators 20–22, and an AND gate AD4 for ANDing an output signal from the OR gate OR2 and the output signal from the OR gate OR1 in the individual data transmission rate detector 43 and outputting the ANDed result as the individual data error rate detect signal to the error detector 500.

The second individual detector 50 is the same in construction as the first individual detector 40 and details thereof will thus be omitted.

The operation of the automatic data transmission rate detection circuit with the above-mentioned construction in accordance with the present invention will hereinafter be described in detail with reference to FIGS. 6A to 8.

Figure 6A:
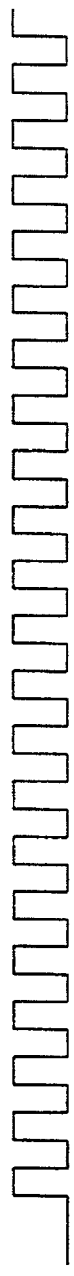
Figure 6B:
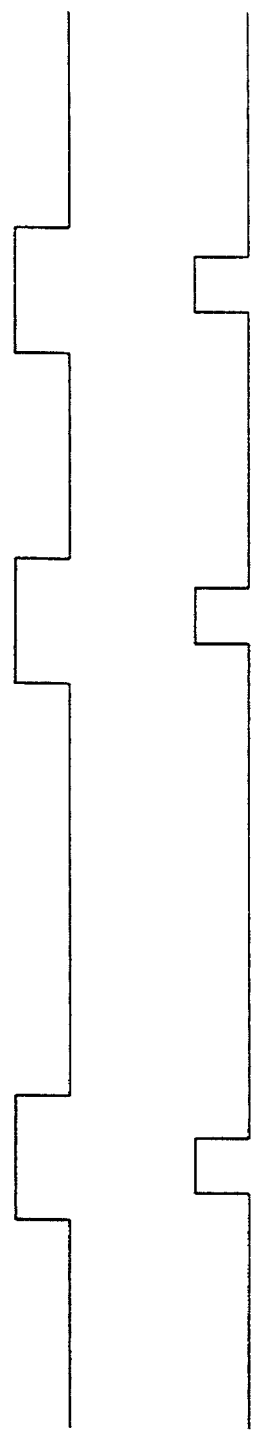
Figure 6C:
Figure 6D:
Figure 6E:

First, the reference clock pulse CLK as shown in FIG. 6A is applied to the data detector 100, the counting circuit 200 and the data storage unit 300 and the serial data as shown in FIG. 6B is applied to the data detector 100. Then, the data detector 100 detects the serial data at the rising or falling edge of the reference clock pulse CLK and supplies its output signal as shown in FIG. 6C to the counting circuit 200. The counting circuit 200 up-counts the reference clock pulse CLK as shown in FIG. 6D. The counting circuit 200 clears its count upon inputting the output signal from the data detector 100 at its clear terminal during the counting operation. The counting circuit 200 then supplies its output value before being cleared, as shown in FIG. 6E, to the data storage unit 300. The data storage unit 300 stores the output value from the counter 200 upon inputting the output signal from the data detector 100 at its load enable terminal and outputs the stored value to the individual detection circuit 400.

Generally, frequency modulation (referred to hereinafter as FM) and modified frequency modulation (referred to hereinafter as MFM) methods have been proposed as data coding methods. The FM method is to store data every clock. The MFM method does not store data every clock. Namely, the MFM method stores a clock when data has 0 level successively, that is, it is changed from 0 to 0 in level. The FM and MFM methods have the effect of increasing a data storage density. In view of a clock rate, the FM method provides clock intervals of n and 2n, whereas the MFM method provides clock intervals of n, 1.5n and 2n.

On the basis of the above data coding methods, the comparison circuit 41 includes the n multiple period comparator 11, the 1.5n multiple period comparator 12 and the 2n multiple period comparator 13, where n is a data transmission rate and 1, 1.5 and 2 are storage densities of the input data to the data detector 100.

First, the output value from the data storage unit 300 as shown in FIG. 6E is applied to the comparison circuit 41 in the first individual detector 40 in the individual detection circuit 400. In the comparison circuit 41, each of the n multiple period comparator 11, the 1.5n multiple period comparator 12 and the 2n multiple period comparator 13 compares the output value from the data storage unit 300 with its fixed reference value within the allowable error range of ±10%.

When the output value from the data storage unit 300 is present within the range of ±10% with respect to the fixed reference value, the corresponding comparator in the comparison circuit 41 is made active. As a result, the up-counting operation is performed by the counter in the counting circuit 42 connected to the active comparator in the comparison circuit 41.

For example, in the case where values of 11, 12 and 13 are outputted from the data storage unit 300 and applied to the n multiple period comparator 11, the 1.5n multiple period comparator 12 and the 2n multiple period comparator 13 in the comparison circuit 41, respectively, and the data transmission rate n is 12, the n multiple period comparator 11 is made active because the values of 11, 12 and 13 are present within the range of ±10% with respect to the fixed reference value thereof. Namely, since the fixed reference value of the n multiple period comparator 11 is 12, the fixed reference value of the 1.5n multiple period comparator 12 is 18 and the fixed reference value of the 2n multiple period comparator 13 is 24, the values of 11, 12 and 13 are present within the range of ±10% with respect to the fixed reference value of the n multiple period comparator 11. In this case, the first counter 14 in the counting circuit 42 connected to the n multiple period comparator 11 increments its count by one and the remaining counters 15 and 16 perform no counting operation. Each of the comparators 17–19 in the individual data transmission rate detector 43 and the comparators 20–22 in the individual data error rate detector 44 is made active when the corresponding one of the output signals from the first to third counters 14–16 in the counting circuit 42 has a larger value than the fixed reference value thereof. Noticeably, the first to third counters 14–16 in the counting circuit 42 provide their counts larger than the fixed reference values of the comparators 17–19 in the individual data transmission rate detector 43 and the comparators 20–22 in the individual data error rate detector 44.

In the individual data transmission rate detector 43, the comparators 17–19 compare the corresponding output signals from the first to third counters 14–16 in the counting circuit 42 with their fixed reference values and output the compared results to the AND gates AD1–AD3. Each of the AND gates AD1–AD3 performs its AND operation with respect to the output signals from different two of the comparators 17–19 and supplies the ANDed result to the OR gate OR1. The OR gate OR1 performs its OR operation with respect to all the output signals from the AND gates AD1–AD3 and outputs the ORed result as the individual data transmission rate detect signal to the system control circuit SCC and the density detector 600. The output signal from the OR gate OR1 is also applied to one input terminal of the AND gate AD4 in the individual data error rate detector 44. Noticeably, a 1 level state of the output signal from the OR gate OR1 signifies that the individual data transmission rate has been detected. A 0 level state of the output signal from the OR gate OR1 signifies that the individual data transmission rate detection is being processed.

In the individual data error rate detector 44, the comparators 20–22 compare the corresponding output signals from the first to third counters 14–16 in the counting circuit 42 with their fixed reference values and output the compared results to the OR gate OR2. The OR gate OR2 performs its OR operation with respect to all the output signals from the comparators 20–22 and outputs the ORed result to the other input terminal of the AND gate AD4.

The AND gate AD4 performs its AND operation with respect to the output signal from the OR gate OR1 at its one input terminal and the output signal from the OR gate OR2 at its other input terminal and outputs the ANDed result as the individual data error rate detect signal to the error detector 500. The output signal from the AND gate AD4 indicates whether an error is present in the individual data transmission rate detected by the individual data transmission rate detector 43. Namely, the individual data error rate detector 44 detects an error rate in the case where the detected individual data transmission rate is not stable due to a severe variation in input form.

The second individual detector 50 is the same in operation as the first individual detector 40 and details thereof will thus be omitted.

In the density detector 600, the OR gate OR3 performs its OR operation with respect to the individual data transmission rate detect signals from the n individual detectors in the individual detection circuit 400. As a result of the OR operation, the OR gate OR3 outputs the entire data transmission rate detect signal to the system control circuit SCC through a line T3. In the error detector 500, the OR gate OR4 performs its OR operation with respect to the individual data error rate detect signals from the n individual detectors in the individual detection circuit 400. As a result of the OR operation, the OR gate OR4 outputs the entire data error rate detect signal to the system control circuit SCC through a line T4.

For example, in the case where the output signals from the density and error detectors 600 and 500 on the lines T3 and T4 are both 0 in level as shown in FIG. 8, the entire data transmission and error rates are being detected. If the output signals from the density and error detectors 600 and 500 on the lines T3 and T4 are 1 and 0 in level as shown in FIG. 8, respectively, the entire data transmission rate has been detected with no entire data error rate detected. This case signifies that the detected entire data transmission rate is normal. On the other hand, if the output signals from the density and error detectors 600 and 500 on the lines T3 and T4 are both 1 in level as shown in FIG. 8, the entire data transmission rate has been detected with the entire data error rate detected. This case signifies that the detected entire data transmission rate is abnormal. This abnormal entire data transmission rate results from the presence of an unformatted state or a damage on a data storage medium.

The output signals from the first and second individual detectors 40 and 50 are applied to the system control circuit SCC through lines T1 and T2, respectively. Also, the output signals from the density and error detectors 600 and 500 are applied to the system control circuit SCC through the lines T3 and T4, respectively.

As apparent from the above description, according to the present invention, the automatic data transmission rate detection circuit checks whether an error is present in a transmission rate of data in a storage medium, upon detecting the data transmission rate. If it is checked that the detected data transmission rate has no error, then it is allowed. Therefore, the automatic data transmission rate detection circuit of the present invention has a shorter data transmission rate detecting time than a conventional one which scans all tracks using all given clock transmission rate pulse signals. Also, the automatic data transmission rate detection circuit reduces burden on an input/output device. Therefore, the present invention has the effect of enhancing the performance of an input/output system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic data transmission rate detection circuit comprising:

data detection means for detecting input data in response to an external reference-clock pulse;

counting means for up-counting the reference clock pulse, said counting means clearing its count upon inputting an output signal from said data detection means at its clear terminal during its counting operation;

data storage means for storing an output value from said counting means upon inputting the output signal from said data detection means at its load enable terminal;

individual detection means including a plurality of individual detectors, each of said plurality of individual detectors detecting a transmission rate and an error rate of individual data in response to an output signal from said data storage means;

density detection means for detecting the entire data transmission rate in response to individual data transmission rate detect signals from said plurality of individual detectors in said individual detection means; and error detection means for detecting in response to individual data error rate detect signals from said plurality of individual detectors in said individual detection means whether an error is present in the entire data transmission rate detected by said density detection means.

2. An automatic data transmission rate detection circuit as set forth in claim 1, wherein said plurality of individual detectors in said individual detection means are connected in parallel to said data storage means.

3. An automatic data transmission rate detection circuit as set forth in claim 2, wherein said plurality of individual detectors in said individual detection means includes:

a comparison circuit for performing a plurality of comparison operations with respect to the output signal from said data storage means;

a counting circuit for performing a plurality of up-counting operations in response to a plurality of output signals from said comparison circuit, respectively;

an individual data transmission rate detector for detecting the individual data transmission rate in response to a plurality of output signals from said counting circuit and outputting the resultant individual data transmission rate detect signal to said density detection means; and an individual data error rate detector for detecting the individual data error rate in response to the plurality of output signals from said counting circuit and the individual data transmission rate detect signal from said individual data transmission rate detector and outputting the resultant individual data error rate detect signal to said error detection means.

4. An automatic data transmission rate detection circuit as set forth in claim 3, wherein said comparison circuit includes an n multiple period comparator, a 1.5n multiple period comparator and a 2n multiple period comparator connected in parallel between said data storage means and said counting circuit.

5. An automatic data transmission rate detection circuit as set forth in claim 4, wherein said n multiple period comparator, said 1.5n multiple period comparator and said 2n multiple period comparator have the same allowable error range.

6. An automatic data transmission rate detection circuit as set forth in claim 5, wherein said allowable error range is about ±10% with respect to fixed reference values of said n multiple period comparator, said 1.5n multiple period comparator and said 2n multiple period comparator.

7. An automatic data transmission rate detection circuit as set forth in claim 3, wherein said counting circuit includes first to third counters connected in parallel between said comparison circuit and said individual data transmission and error rate detectors.

8. An automatic data transmission rate detection circuit as set forth in claim 3, wherein said counting circuit includes at least two counters, each of said at least two counters having an output value larger than a fixed reference value of each of comparators in said individual data transmission and error rate detectors.

9. An automatic data transmission rate detection circuit as set forth in claim 3, wherein said individual data transmission rate detector includes:

a plurality of comparators, each of said plurality of comparators being made active when a corresponding one of said plurality of output signals from said counting circuit has a larger value than a fixed reference value thereof;

a plurality of AND gates, each of said plurality of AND gates ANDing output signals from different two of said plurality of comparators; and an OR gate for ORing output signals from said plurality of AND gates and outputting the ORed result as the individual data transmission rate detect signal to said density detection means and said individual data error rate detector.

10. An automatic data transmission rate detection circuit as set forth in claim 3, wherein said individual data error rate detector includes:

a plurality of comparators, each of said plurality of comparators being made active when a corresponding one of said plurality of output signals from said counting circuit has a larger value than a fixed reference value thereof;

an OR gate for ORing output signals from said plurality of comparators; and an AND gate for ANDing an output signal from said OR gate and the individual data transmission rate detect signal from said individual data transmission rate detector and outputting the ANDed result as the individual data error rate detect signal to said error detector.

11. An automatic data transmission rate detection circuit as set forth in claim 1, wherein said density detection means includes an OR gate for ORing the individual data transmission rate detect signals from said plurality of individual detectors in said individual detection means and outputting the ORed result as an entire data transmission rate detect signal.

12. An automatic data transmission rate detection circuit as set forth in claim 1, wherein said error detection means includes an OR gate for ORing the individual data error rate detect signals from said plurality of individual detectors in said individual detection means and outputting the ORed result as an entire data error rate detect signal.

* * * * *